Jan. 29, 1963  H. H. ADISE ETAL  3,075,411
ROTARY INDEXING HEAD
Filed Dec. 30, 1958
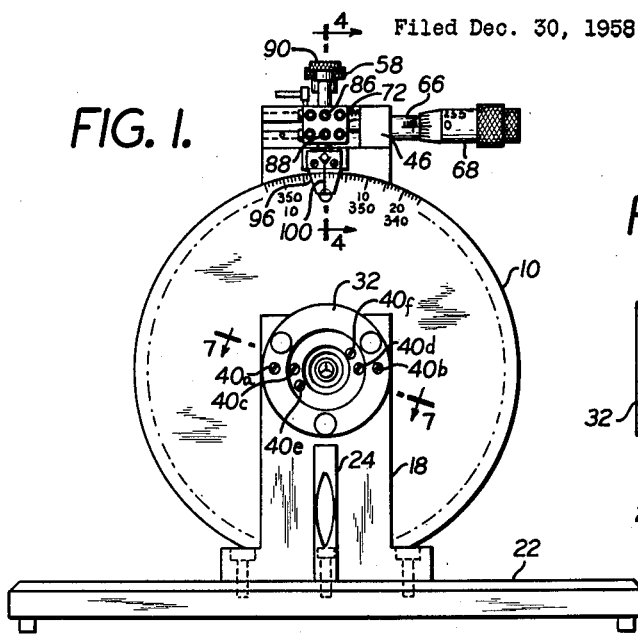
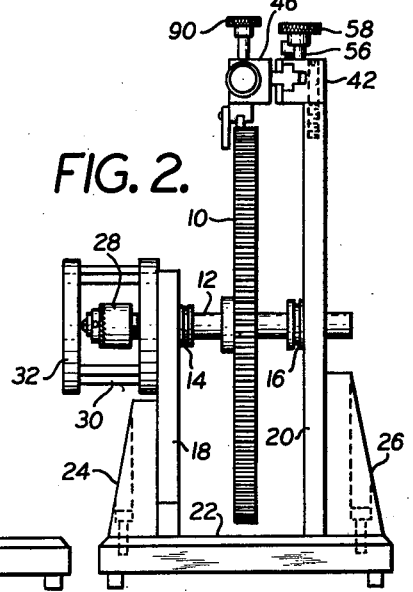
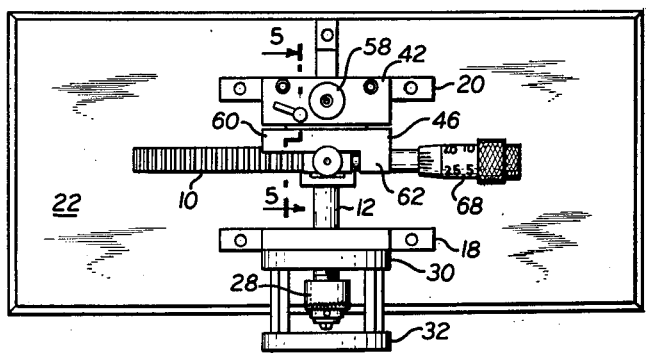
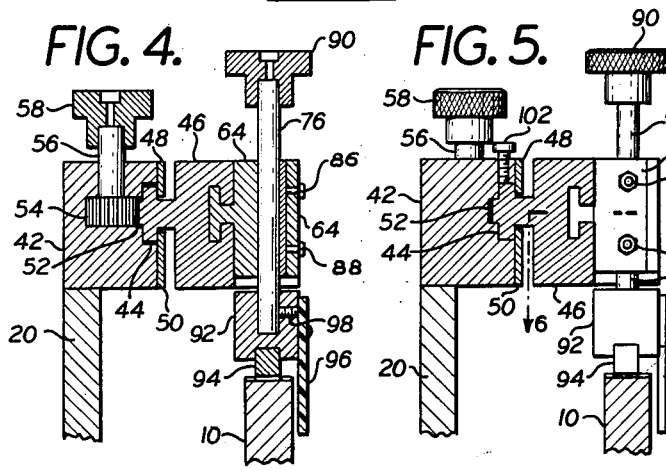
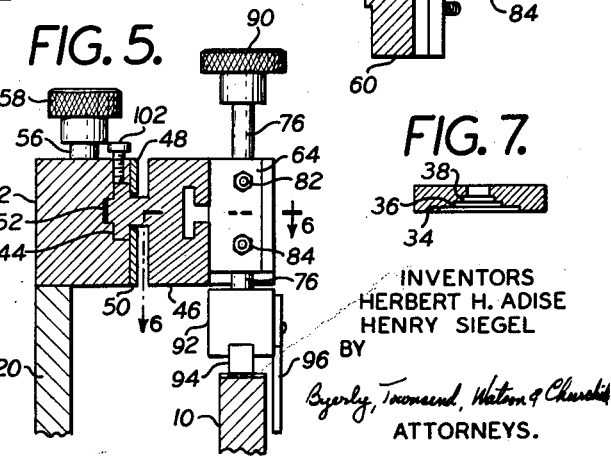
INVENTORS
HERBERT H. ADISE
HENRY SIEGEL
BY
Byerly, Townsend, Watson & Churchill
ATTORNEYS.

United States Patent Office 3,075,411
Patented Jan. 29, 1963

3,075,411
ROTARY INDEXING HEAD
Herbert H. Adise and Henry Siegel, Great Neck, N.Y., assignors to Millitest Corporation, Hempstead, N.Y., a corporation of New York
Filed Dec. 30, 1958, Ser. No. 783,923
5 Claims. (Cl. 74—815)

The present invention relates to indexing devices and more particularly to an indexing head for accurately indexing a shaft relative to its support.

In order to accurately test or calibrate precision electromechanical rotary transducers it is necessary to determine precisely the rotation of the shaft relative to the body thereof, i.e., the support for the shaft. For example, precision potentiometers are tested in a voltage bridge circuit by comparison with a calibrated standard potentiometer. For this purpose it is necessary to know the angular setting of both potentiometers within very close limits. Therefore, it is an object of the present invention to provide an indexing head for determining within a fraction of a minute of arc the angular setting of the shaft of a potentiometer or other electro-mechanical rotary transducer.

For convenience of explanation it will be assumed that the indexing head is constructed for use with precision potentiometers; however, it should be understood that the device can be used anywhere it is desired to index a shaft relative to its support.

In accordance with the invention there is provided an indexing head for accurately indexing a shaft relative to its support, the indexing head comprising a frame, an indexing wheel in the form of a precision gear mounted for axial rotation upon said frame, means for fixedly securing a support for a shaft relative to said frame, means for coupling to said indexing wheel for conjoint rotation a shaft supported by said support, a carriage member mounted on said frame for movement adjacent the periphery of said indexing wheel, control means for determining the movement of said carriage member, a slide block mounted on said carriage member for parallel movement relative thereto, an indexing block carrying a toothed rack, adjustable means joining said indexing block to said slide block in a manner permitting selective tangential operative engagement of said rack with the teeth of said indexing wheel, the movements of said carriage member and said slide block paralleling the line of said tangential engagement, a calibrated micrometric adjustment member carried by said carriage member for micrometric positioning of said slide block relative to said carriage member, and an indicator carried by said indexing block for cooperating with indicia on said indexing wheel, said indicia defining equi-angular increments of said indexing wheel which are equal to a given multiple of the circular pitch of the teeth thereon.

The invention will be better understood after reading the following detailed description of one preferred embodiment thereof with reference to the appended drawings in which:

FIG. 1 is a front elevational view of the indexing head;

FIG. 2 is a side elevational view thereof;

FIG. 3 is a top plan view thereof;

FIG. 4 is a fragmentary sectional view to an enlarged scale taken along line 4, 4 of FIG. 1;

FIG. 5 is a similar fragmentary sectional view to that of FIG. 4, but taken along line 5, 5 of FIG. 3;

FIG. 6 is a fragmentary sectional view taken along line 6, 6 of FIG. 5, and

FIG. 7 is a sectional view taken along line 7, 7 of FIG. 1 showing details of the pilot mounting bracket.

Reference should now be had to the drawings wherein the same reference numerals are used throughout to designate the same parts.

A precision gear 10 is mounted on a horizontal shaft 12 journalled in bearings 14 and 16 supported by spaced standards 18 and 20, the latter being bolted to the base 22 and strenghtened by the braces 24 and 26. The standards 18 and 20, base 22 and braces 24 and 26, form part of a supporting structure or frame. Ball bearings are preferred for bearings 14 and 16. The extension of one end of shaft 12 is threaded and provided with a chuck 28. A chuck that is key tightened such as a ¼ inch Phillips chuck is preferred. Secured to the standard 18 is a mounting bracket 30 carrying a pilot ring 32. The details of the latter are best seen in FIG. 7 wherein pilot openings 34, 36 and 38 of three different sizes are provided for receiving the body members of three different size potentiometers. These openings can be of standard dimensions as will be understood in the art. A plurality of tapped holes 40a, 40b, 40c, 40d, 40e, and 40f are provided for receiving suitable threaded mounting elements.

It should be understood that the pilot ring 32 is disposed for lining up the shaft of a potentiometer coaxially with respect to the shaft 12 and the chuck 28.

Referring to the indexing wheel or gear 10, it is provided with 720 teeth uniformly spaced about its periphery. As seen in FIG. 1, the face of the gear is engraved or otherwise marked with angular dimensions. As shown, the markings represent degrees of arc and are spaced apart a given multiple of the circular pitch of the gear teeth. In the present case the spacing is twice the circular pitch with the indicia coinciding with the root point between every other tooth. For convenience, only a portion of the markings have been shown although it is to be understood that all 360° are marked on the actual device. As shown, bidirectional numbering may be employed.

Carried at the top of the standard 20 is a horizontal block 42 with a T-shaped slot 44 formed therein. A carriage member 46 is mounted in the slot 44 for movement parallel thereto. The flange plates 48 and 50 serve to retain the carriage member. As best seen in FIG. 4 a toothed rack 52 is formed integral with the carriage member 46 and is operatively engaged by the pinion 54 carried at the lower end of shaft 56 in block 42. An adjustment knob crowns the shaft 56, and, upon manual manipulation, imparts controlled movement to the carriage member 46.

As seen in FIG. 3, the carriage member 46 is L-shaped having a main body portion 60 paralleling the plane of the gear 10 with an offset arm 62 overlying the gear 10. As seen in FIGS. 4 to 6, a slide block 64 is mounted on the carriage member 46 for movement parallel to the body portion 60 thereof. The slide block is suspended in the plane of the gear 10 radially spaced from the periphery thereof and movable along a line parallel to a tangent to the gear. A micrometric adjustment member 66 is shown mounted in the arm 62 of the carriage member 46. Rotation of the thimble 68 advances or retracts the spindle 70 which bears against the side of the slide block 64. The tension spring 72 anchored in the arm 62 is secured to the slide block 64 for maintaining it in engagement with the spindle 70. It should be apparent that rotation of thimble 68 provides for micrometric positioning of the slide block 64 relative to the carriage member 46.

As shown in FIG. 6, the slide block 64 has a rectangular bore 74 formed therethrough in which is carried or mounted a plunger 76, also having a rectangular cross-section, but of smaller dimension. A pair of pressure plates 78 and 80 engaging two of the intersecting faces of the plunger 76 are disposed in the space between the plunger and the walls of the bore in the slide block 64 for firmly positioning the plunger relative to the slide block and offering mild resistance to movement of the plunger. Two screws 82 and 84 bear against the plate 76 while screws 86 and 88 (See FIG. 1) bear against plate 80 for adjusting the pressure.

Topping the plunger 76 is a knob 90, while suspended at its lower end is an indexing block 92 carrying a toothed rack 94 and an indicator 96. A set screw 98 may secure the block 92 to the plunger 76 as seen in FIG. 4. As seen in FIGS. 1 and 4, the indicator 96 is in the form of a transparent element, glass or plastic, upon which has been inscribed a hair line 100. The indicator cooperates, as shown, with the indicia on the indexing wheel 10.

The rack 94 is provided with teeth constructed to mesh accurately with the teeth on the gear 10. The plunger 76 functions to raise and lower the indexing block 92 whereby the rack 94 is selectively brought into tangential operative engagement with the teeth of the indexing wheel 10. When the rack 94 is in engagement with the wheel 10, movement of the indexing block either by adjustment of the micrometer thimble 68 or the knob 58 will be communicated to the indexing wheel. It should now be apparent that the indexing wheel can be rotated without disturbing the setting of the micrometer adjustment 66, by use of the knob 58. Alternatively the rack 94 can be disengaged and the wheel 10 rotated by hand to any desired position.

The complete function of the micrometric adjustment has not as yet been explained. In the present device the thimble is provided with 30 subdivisions engraved on its beveled end. The pitch of the micrometric screw should be such that rotation of thimble 68 through one subdivision advances wheel 10 through one minute of arc. That is, one full revolution of thimble 68 should move the spindle 70 through a distance equal to the circular pitch of the gear 10. Because the micrometric adjustment serves as a calibrated adjustment, it is preferred to provide a carriage lock in the form of a threaded member 102 best seen in FIG. 5. The lock 102 can be manipulated to selectively engage the carriage member 56 and prevent movement thereof relative to block 42.

In the operation of the device, the potentiometer or other transducer is inserted in the pilot ring 32 and seated flush to its flange surface. Suitable clamping screws are then inserted in the appropriate tapped holes provided therefor. The chuck 28 can then be finger tightened to lightly clamp the shaft of the potentiometer.

Assuming that it is desired to test the calibration of the potentiometer, it is connected in circuit with the voltage bridge, previously mentioned, and energized. The standard potentiometer is adjusted to the desired initial electrical setting, whereupon plunger 76 is raised disengaging the rack 94 and the indexing wheel 10 rotated until an approximate electrical balance or null in the bridge is obtained. The indexing block 92 is then lowered to engage the rack 94 with the teeth of the indexing wheel 10. As will be well understood, the indexing wheel may require slight displacement in order to achieve satisfactory meshing. The maximum error at this point will be plus or minus 30 minutes of arc. That is, the test potentiometer is electrically phased with the standard within ½°. The chuck 28 is now loosened to free the shaft of the potentiometer, whereupon the rack 94 is again disengaged and the indexing wheel 10 is rotated until the angle corresponding to the nearest ½° to the preset electrical phase of the standard potentiometer is under the hair line 100. The rack 94 is then re-engaged and chuck 28 re-tightened, this time with the tightening key.

In order to preset precisely the desired angle on the indexing device, it is necessary to set also the micrometric adjustment 66. As an example, assume that the desired starting angle is 10 degrees, 15 minutes, then the indexing wheel is set with the 10 degree mark under the hairline 100 and the thimble 68 is adjusted such that the 15 minute mark is opposite the reference point on the associated sleeve. Now in order to achieve accurate electrical phasing, the carriage lock 102 is released and the knob 58 is rotated until a precise electrical balance or null is obtained. The lock 102 should now be re-engaged and the indexing device is set for accurate measurement or readings.

From the foregoing it should be apparent that a very precise instrument has been provided for accurately indexing a shaft to fractions of a minute of arc with the additional feature of being able to initially phase the starting point with respect to a fixed reference. It will be understood that various changes may be made in the specific constructions and details of the device without departing from the true spirit of the invention.

What is claimed is:

1. An indexing head for accurately indexing a shaft relative to its support, said indexing head comprising a frame, an indexing wheel in the form of a precision gear mounted for axial rotation upon said frame, means for fixedly securing a support for a shaft relative to said frame, means for coupling to said indexing wheel for conjoint rotation a shaft supported by said support, a carriage member mounted on said frame for movement adjacent the periphery of said indexing wheel, control means for determining the movement of said carriage member, a slide block mounted on said carriage member for parallel movement relative thereto, an indexing block carrying a toothed rack, adjustable means joining said indexing block to said slide block in a manner permitting selective tangential operative engagement of said rack with the teeth of said indexing wheel, the movements of said carriage member and said slide block paralleling the line of said tangential engagement, a calibrated micrometric adjustment member carried by said carriage member for micrometric positioning of said slide block relative to said carriage member, and an indicator carried by said indexing block for cooperating with indicia on said indexing wheel, said indicia defining equi-angular increments of said indexing wheel which are equal to a given multiple of the circular pitch of the teeth thereon.

2. An indexing head for accurately indexing a shaft relative to its support, said indexing head comprising a frame, an indexing wheel in the form of a precision gear mounted for axial rotation upon said frame, means for fixedly securing a supoprt for a shaft relative to said frame, means for coupling to said indexing wheel for conjoint rotation a shaft supported by said support, a slide block, a carriage member supporting said slide block in the plane of said indexing wheel radially spaced from the periphery thereof for movement relative to said carriage member along a line parallel to a tangent to said periphery, said carriage member being mounted on said frame for independent movement parallel to said line, control means for determining the movement of said carriage member, a toothed rack, a plunger secured at one end to said rack and supported for longitudinal sliding motion in said slide block such as to position said rack for selective operative engagement with the teeth of said indexing wheel along said tangent, a calibrated micrometric adjustment member carried by said carriage member for micrometric positioning of said slide block relative to said carriage member, and an indicator joined to said rack for cooperating with indicia on said indexing wheel, said indicia defining equi-angular increments of said indexing wheel which are equal to a given multiple of the circular pitch of the teeth thereon.

3. An indexing head according to claim 2, wherein said plunger has a rectangular cross-section, said slide block has a rectangular bore therethrough of larger cross-sectional dimension to receive said plunger, and a pair of pressure plates engaging two of the intersecting faces of said plunger are disposed in the space between the plunger and the walls of the bore in the slide block for firmly positioning said plunger relative to the slide block.

4. An indexing head for accurately indexing a shaft relative to its support, said indexing head comprising a frame, an indexing wheel in the form of a precision gear mounted for axial rotation upon said frame, means for fixedly securing a support for a shaft relative to said frame, means for coupling to said indexing wheel for conjoint rotation a shaft supported by said support, a slide block supporting a toothed rack in the plane of said indexing wheel for selective operative engagement with the teeth of said indexing wheel along a tangent to the periphery thereof, a calibrated micrometric adjustment member, a carriage member supporting both said slide block and said adjustment member for micrometric positioning of said slide block relative to said carriage member, said indexing wheel being rotated by movement of said rack with said slide block under the control of said adjustment member, an indicator joined to said rack for cooperating with indicia on said indexing wheel, said indicia defining equi-angular increments of said indexing wheel which are equal to a given multiple of the circular pitch of the teeth thereon, and means supported by said frame for adjusting the position of said carriage thereby rotating said indexing wheel without changing either the setting of said adjustment member or the relationship between said indicator and said indicia.

5. An indexing head for accurately indexing the shaft relative to the body of an electro-mechanical rotary transducer, said indexing head comprising a frame, an indexing wheel in the form of a precision gear mounted for axial rotation upon said frame, a piloted mounting member for supporting the body of an electro-mechanical rotary transducer relative to said frame with the shaft of the transducer aligned co-axially with the axis of said indexing wheel, means for coupling said shaft to said indexing wheel for conjoint rotation, a slide block supporting a toothed rack in the plane of said indexing wheel for selective operative engagement with the teeth of said indexing wheel along a tangent to the periphery thereof, a calibrated micrometric adjustment member, a carriage member supporting both said slide block and said adjustment member for micrometric positioning of said slide block relative to said carriage member, said indexing wheel being rotated by movement of said rack with said slide block under the control of said adjustment member, an indicator joined to said rack for cooperating with indicia on said indexing wheel, said indicia defining equi-angular increments of said indexing wheel which are equal to a given multiple of the circular pitch of the teeth thereon, and means supported by said frame for adjusting the position of said carriage thereby rotating said indexing wheel without changing either the setting of said adjustment member or the relationship between said indicator and said indicia.

References Cited in the file of this patent
UNITED STATES PATENTS

| | | |
|---|---|---|
| 774,515 | Geier | Nov. 8, 1904 |
| 2,403,919 | Hagner | July 15, 1946 |
| 2,411,870 | Clauvet | Dec. 3, 1946 |
| 2,588,932 | Klingenberg | Mar. 11, 1952 |
| 2,972,260 | Nilges | Feb. 21, 1961 |